United States Patent [19]

Elam

[11] Patent Number: 4,607,743
[45] Date of Patent: Aug. 26, 1986

[54] METHOD AND APPARATUS TO ROTATE MOVING OVERLAPPING STACKED BOXES

[76] Inventor: Ormand K. Elam, 8414 Linn Rd., Middletown, Ohio 45042

[21] Appl. No.: 610,027

[22] Filed: May 14, 1984

[51] Int. Cl.⁴ ............................................. B65G 47/24
[52] U.S. Cl. .................................... 198/415; 198/598; 271/185
[58] Field of Search ............... 198/411, 412, 415, 416, 198/408, 423, 598; 271/184, 185, 225

[56] References Cited

U.S. PATENT DOCUMENTS

| 3,165,193 | 1/1965 | Stevenson, Jr. | 198/415 |
| 3,462,001 | 8/1969 | Boyce | 198/415 |
| 3,809,214 | 5/1974 | Reist | 271/185 X |
| 4,086,744 | 5/1978 | Seragnoli | 198/416 X |

FOREIGN PATENT DOCUMENTS

| 1283151 | 11/1968 | Fed. Rep. of Germany | 198/416 |
| 637900 | 8/1983 | Switzerland | 271/184 |

Primary Examiner—Joseph E. Valenza
Assistant Examiner—Michael Stone
Attorney, Agent, or Firm—Frost & Jacobs

[57] ABSTRACT

A device for rotating a moving, overlapping stack of flattened boxes on a conveyor belt comprising a motor, a driven pulley driven by the motor, a freely rotating pulley, and an endless belt rotating around both of the pullies, wherein the device is positioned slightly above the conveyor belt at an obtuse angle to the direction of travel of the conveyor belt. The stack of flattened boxes are positioned on the endless belt wherein the rotation of the endless belt causes the flattened boxes to rotate on the conveyor belt.

10 Claims, 7 Drawing Figures

METHOD AND APPARATUS TO ROTATE MOVING OVERLAPPING STACKED BOXES

BACKGROUND OF THE INVENTION

1. Field of the Invention

The present invention concerns a method and the associated apparatus for reorienting a moving stack of paper products. In particular, the present invention employs a simple, economic, extremely efficient method of reorienting moving paper products through 90° to permit packaging the paper products in a specific orientation in a typical cardboard container.

2. Description of the Prior Art

Many products such as cereals, hair treatment kits, and nails are packaged in paper containers for retail sale to the consumer. These paper containers are generally manufactured by first forming all the edges for the container by scoring or creasing a piece of cardboard; printing and labeling the cardboard; and gluing one or more edges together to form the shell of the container. The shell is flat, but is quickly formed into a container by opening the shell and securing the bottom and top ends of the shell in any manner known in the art, such as by gluing.

In order to ship the containers to the user manufacturing company, the shells are not packaged in the fully open position because of spatial requirements. The shells are shipped to the user manufacturer in flat form and the manufacturer secures the bottom and top ends to form the container.

Because certain containers must be glued in a manner different from other containers, user manufacturers generally specify the manner in which the shell is to be oriented when shipped. Consequently, container makers must have the ability to easily affect orientation of the shell as specified by the user manufacturer. The following patents teach various methods of reorienting paper products.

U.S. Pat. No. 4,387,890 to Lampe illustrates apparatus for changing the orientation of stacked, overlying sheets of paper by employing a turntable to lift the sheets off a first conveyor, rotating the sheets through 90 degrees, and placing the sheets on a second conveyor, aligned with the first conveyor. This device interrupts a moving line because it is not a continuous procedure.

U.S. Pat. No. 4,372,436 to Achelpohl et al teaches apparatus for deflecting flat sheets through 180° by two simultaneous 90 degree rotations. A first double belt conveyor is in alignment with a perpendicular conveyor, which is in alignment with a third conveyor, parallel to the first double belt conveyor. On the inside angle, at the confluence of each junction of conveyor belts, is a turning device complete with gripper tongs for aiding in the transfer of paper from conveyor to conveyor during reorientation. While this device is a continuous procedure, and it maintains a stacked array, it is incapable of reorienting a paper line especially if the paper is stacked.

It is also known that upright curved deflectors, typically made from metal are employed for directing and orienting a stack of paper products 90 degrees from the original orientation. These deflectors are inconsistent and frequently jam an entire stacked line of moving paper products. Generally, an operator is assigned to continually correct the inconsistencies caused by the deflector.

SUMMARY OF THE INVENTION

The present invention is designed to rotate a moving overlapping stack of flattened paper containers, like boxes, through 90° while maintaining the moving overlapping sequence of the containers. Generally, the stack moves by means of a conveyor belt. The flattened boxes or the like, can be rotated by the device of the present invention with little regard for speed. In other words, the device of the present invention includes a variable speed control designed to cooperate with conveyor belt speeds from 0 to 200 feet per minute. Greater speeds can be achieved, if desired, by merely employing a high speed motor to drive the device of the present invention, or gear the device such that the driver arm is rotating at higher RPM's than the motor.

Virtually there is no limit on the flattened size of the container to be rotated because the distance between the driven arm and the freely rotating arm may be as large as is necessary. Typically the device can be mounted or suspended by any practical means available. The device is designed to be at an obtuse angle with respect to the direction of movement of the conveyor belt. The device may additionally be canted upwardly or downwardly such that one end of the device is lower than the other end.

In the broadest sense the present invention includes a method of rotating a moving, overlapping stack of paper comprising placing said stack in direct contact with a rotating endless belt positioned under said stack, such that said belt fans out or spreads out the stacked paper as it is rotated by said endless belt. The broadest sense of the present invention also includes apparatus comprising: a motor, a driven shaft or arm coupled to said motor, a freely rotating shaft, an endless belt mounted between and on said driven shaft and said freely rotating shaft.

DESCRIPTION OF THE PREFERRED EMBODIMENTS

Figure 1:
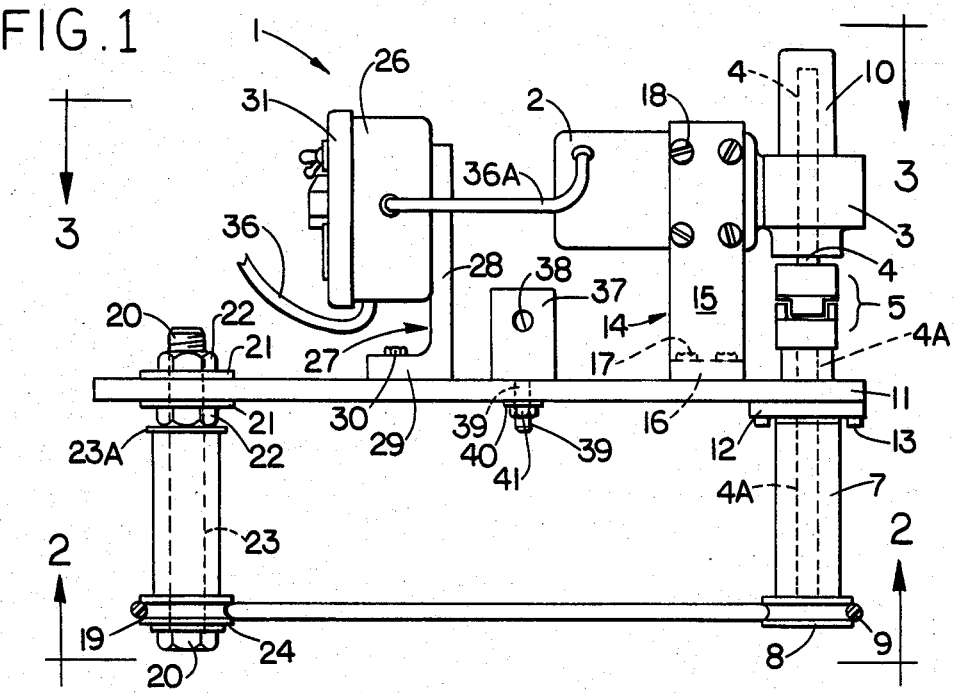
FIG. 1 illustrates an elevational view of the device of the present invention.

The device of the present invention, employed to rotate a moving stack of overlapping paper, preferably flatten cardboard boxes, is designated by reference numeral 1 in FIG. 1. The device is powered by an electric reversible variable speed motor 2 and is securely attached to converter 3, which converts the rotating horizontal shaft output of motor 2 to a rotating vertical shaft output. The vertical shaft 4 is capped at its upper end by a protective cover 10, which is easily removed for repairs, maintenance, etc. The lower end of vertical shaft 4 is directly connected to vertical shaft 4A, shown in phantom in FIG. 1. Shaft 4A is protected by a short sleeve 6, which is stationary, and a long sleeve 7, which is freely rotatable. The lower end shaft 4A is integrally secured to pulley 8 which is driven by motor 2 through shaft 4, coupler 5 and shaft 4A. Long sleeve 7 rests upon pulley 8 and rotates with it.

An oblong metal support plate 11 forms the support foundation for the entire device. Shaft 4A extends through an opening, not shown, positioned at one end of support plate 11. Short sleeve 6 protects the shaft from coupler 5 to the upper surface of support plate 11, while sleeve 7 protects the shaft from the bottom surface of support plate 11 to pulley 8. Long sleeve 7 which rests upon and rotates with pulley 8 is partially positioned by mounting plate 12, which is securely fastened to support plate 11 by bolts 13. Mounting plate 12 has a sleeve ring (not shown) which extends into long sleeve 7 which prevents the long sleeve 7 from wobbling while rotating.

Motor 2 and converter 3 are integrally secured to support plate 11 by an L-shaped bracket 14 comprising a short leg 16 (see FIGS. 1 and 7), which is bolted to plate 11 by bolts 17, and a long leg 15 including bolts 18 which rigidly bolt the motor to the long leg.

Figure 2:
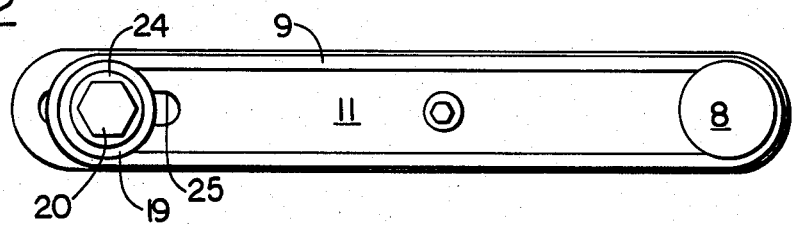
FIG. 2 is a bottom view of the support system and endless belt along lines 2—2 of FIG. 1.
Figure 3:
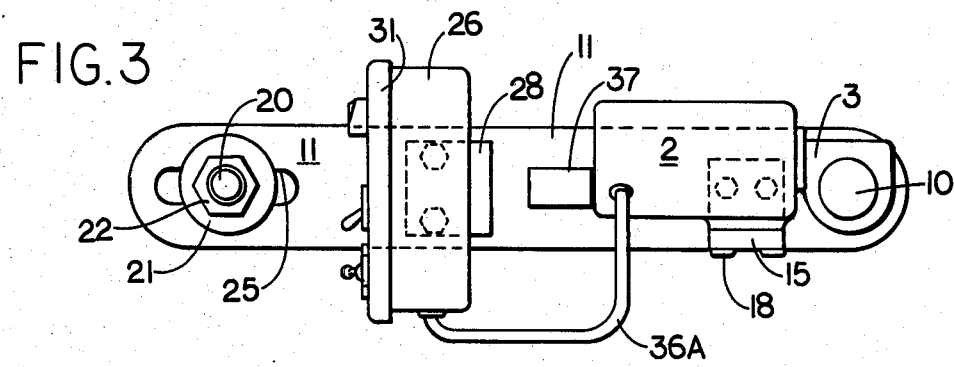
FIG. 3 is a plan view along lines 3—3 of FIG. 1.

At the end of support plate 11 away from shaft 4A, another pulley 19, freely rotates on stud shaft 20. The head of stud shaft 20 is separated from pulley 19 by means of a washer 24. The middle portion of the stud shaft between the pulley and support plate 11 is protected by sleeve 23 which freely rotates with pulley 19, in a similar manner as long sleeve 7. Conduit extension 23A tapers convergingly in which the tapered portion extends inside sleeve 23. The conduit extension can be made of a low friction plastic and permits sleeve 23 to rotate with little or no wobble. A pair of nuts 22 and a set of corresponding washers 21 position the stud shaft on support plate 11 such that pulley 19 is the same distance away from support plate 11 as pulley 8. Furthermore, nuts 22 and washers 21 securely fasten stud shaft 20 to support plate 11 by means of longitudinal slot 25 (illustrated in FIGS. 2 and 3). Longitudinal slot 25 permits the adjustment of stud shaft 20 on support plate 11 in order to maintain endless belt 9 in a snug fashion.

Endless belt 9 can be a round belt as shown, or a V-belt or flat belt. The belt can be made of hard or soft rubber, or plastic, and can be reinforced with synthetic fibers such as nylon, rayon, dacron or arimid, or with metal fibers such as steel, or the like as is well known to those skilled in the art. Preferably the belt is round, having a ⅜ inch diameter and is made of a thermoplastic or neoprene rubber so that the belt may be made any desired length by fusing the ends together as is conventionally known. Although the belt is generally resilient and flexible, stud shaft 20 is freely movable by loosening the top nut 22 and moving shaft 20 toward shaft 4A to permit replacement of belt 9. Shaft 20 is then moved outwardly, away from shaft 4A until the new belt fits snuggly, at which point top nut 22 is re-tightened.

Figure 4:
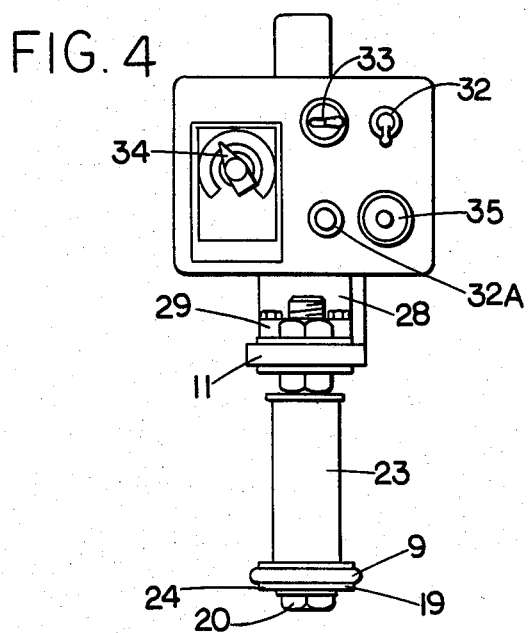
FIG. 4 is another elevational view of the device of claim 1 to specifically illustrate the control box.

Control 26 which controls the speed and direction of rotation of motor 2 is mounted on support plate 11 on the same side as motor 2, by an L-shaped bracket 27. The L-shaped bracket 27 has a short leg 9, which is integrally secured to plate 11 by means of bolts 30, and a long leg 38, which is securely attached to control 26 with, for example, bolts, adhesive or welding. The front plate 31 of control 26 can best be viewed in FIGS. 4 and 7. Switch 32 is the power on/off switch for motor 2. Additionally, indicator light 32A visually signifies whether the power is on or off by whether the light is on or off. Thus, a quick glance from a substantial distance is sufficient to signify whether the device is on or off. Switch 33 is the reversing switch to run the endless belt counter-clockwise or clockwise. This gives the device more versatility and allows the device to rotate the stacked paper in either direction. Switch 34 is the rheostat and controls the speed of motor 2 by varying the amount of current received by motor 2. The rheostat can be set in a range from 0 to 200 feet per minute based upon the size of the current device. Based upon a normal stacked density, the device can rotate 30,000 to 60,000 boxes per hour. Of course, higher and lower amounts can be achieved depending on speed and density. Reset button 35 is the conventional type designed to prevent damage to the motor. Electric cord 36 supplies power to control 26 and to motor 2.

Suspending bracket 37 includes an opening 38 to which foundation supports can suspend the entire device by hooks, cable, arms, etc. The suspending bracket also includes an integral stud 39 which projects through a corresponding opening in support plate 11 whereby the suspending bracket is rigidly secured to support plate 11 by means of washer 40 and nut 41. Bracket 37 may be at any angle with respect to the longitudinal edge of support plate 11 so as to accomodate any type of suspension means and to properly orient the device.

Figure 5:
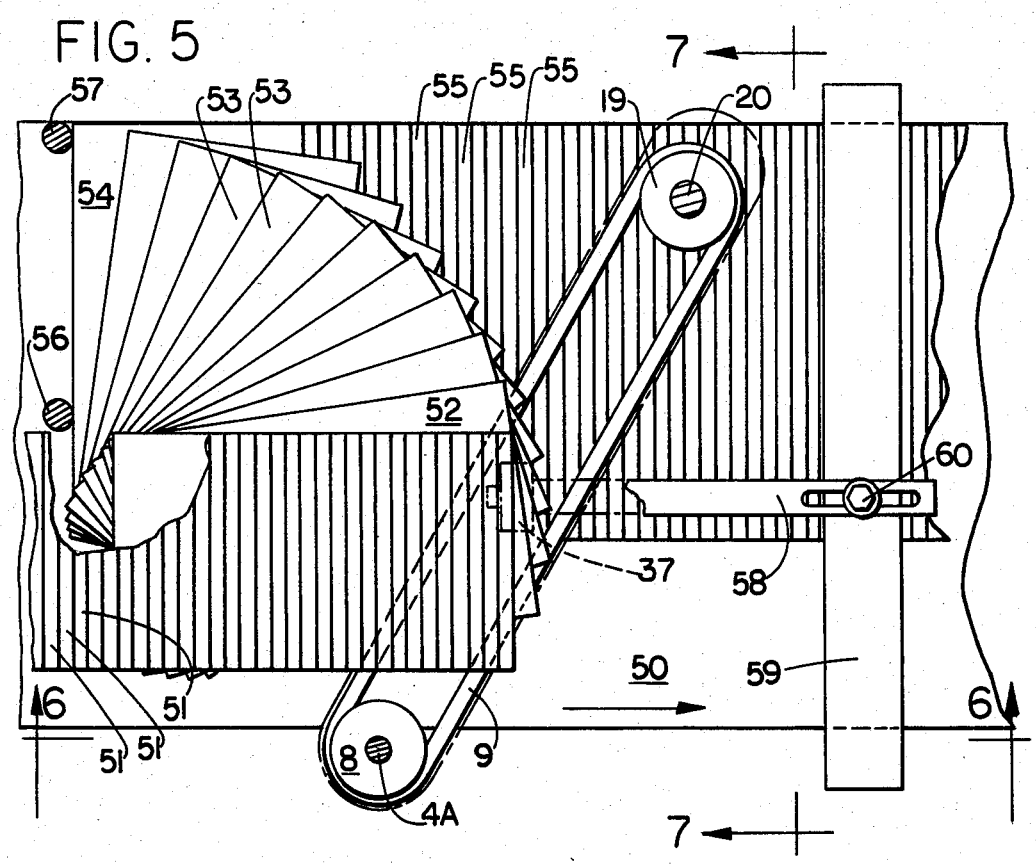
FIG. 5 illustrates a plan view of the conveyor belt transporting the overlapping stacked paper with a partial view of the endless belt drive system.
Figure 6:
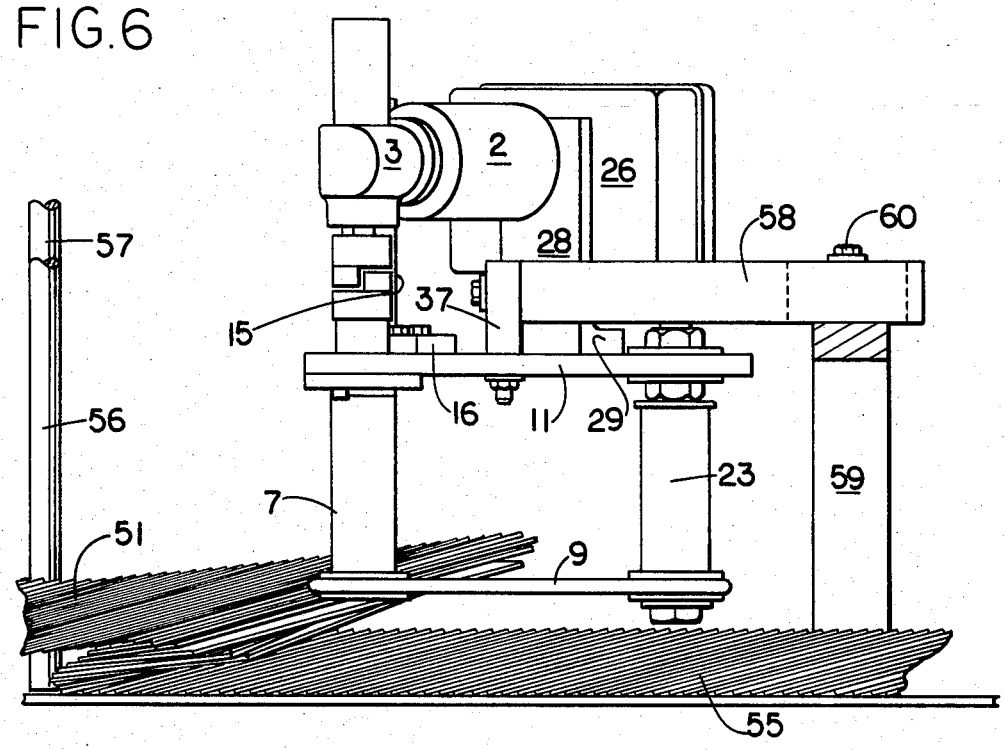
FIG. 6 is an elevational view along lines 6—6 of FIG. 5 with all of the device of the present invention illustrated therein.
Figure 7:
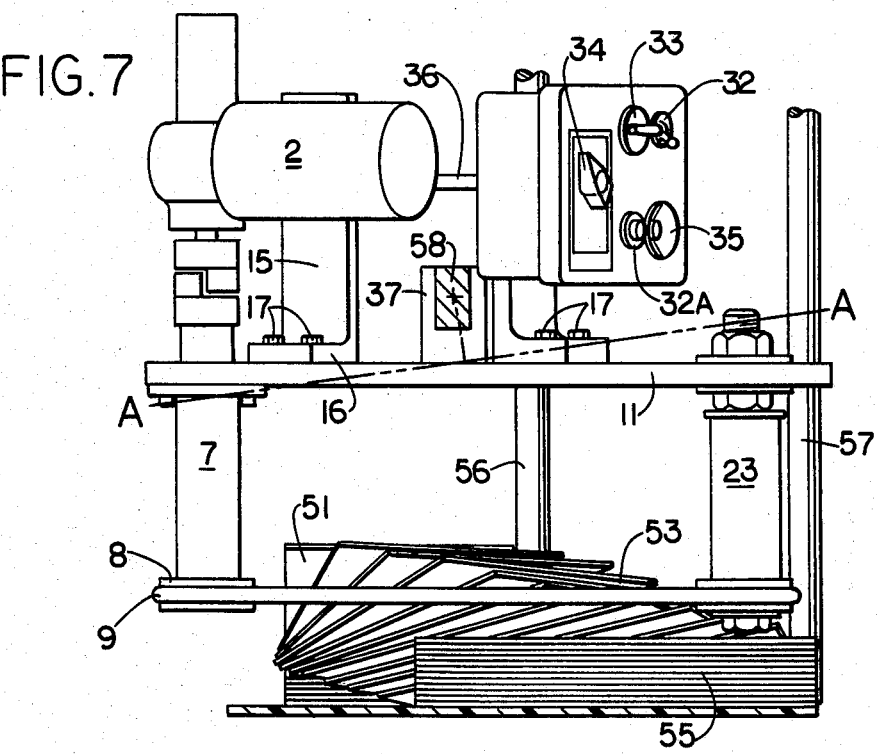
FIG. 7 is an elevational view along lines 7—7 of FIG. 5 with all of the device of the present invention illustrated therein.

While FIGS. 1-4 illustrate the device, per se, FIGS. 5-7 illustrate the device mounted and in operation with respect to moving, overlapping stacked paper.

As illustrated in FIG. 5, a conveyor belt 50 is moving in the direction of the arrow (from left to right when viewing FIG. 5). Overlapping stacked paper 51, such as flattened cardboard boxes, is shown arranged on conveyor belt 50 by box forming equipment not shown and not a part of this invention. At least some of the cardboard boxes 51 are positioned upon endless belt 9 and caused to rotate so that their leading edge is a longitudinal edge as represented by reference numeral 55. Reference numeral 52 illustrates a cardboard box as it first shifts on conveyor 50. Reference numeral 53 represents boxes that have shifted approximately half the desired rotation, while reference numeral 54 represents a fully rotated box having a longitudinal leading edge. The position of the device 1 is illustrated by pulleys 8 and 19 and endless belt 9. In phantom is shown suspending bracket 37 which is securely mounted to an arm 58, which is further secured to a base stand 59 by means of washer and bolt assembly 60.

FIG. 6 illustrates a side view of the operation illustrated in FIG. 5. As shown, boxes 51 are positioned upon endless belt 9. Because of the stacked overlapping arrangement of the boxes, the boxes are actually lifted off the conveyor belt a substantial distance well before the boxes get to belt 9. However, once they drop from belt 9 they continue to rotate until one or more stops 56,57 terminate the rotation. Because the conveyor belt continues to move at a constant speed, the density of the stack is the same both before and after rotation.

FIG. 7 further illustrates the degree to which the boxes are maintained in a lifted position before being positioned on belt 9. Generally, belt 9 is 2 to 3 inches above the surface of the conveyor belt, but the actual distance depends on the density of the pack (a higher density causes the boxes to stand more upright and thus the belt must be higher) and the thickness of each individual box.

In operation, a moving overlapping stack of paper, such as flattened cardboard boxes, is lifted upon endless belt 9 which rotates clockwise when looking down upon the device. This rotates the boxes to the left when viewing along the direction of travel of the conveyor belt. Endless belt 9 is positioned at an obtuse angle with the longitudinal edge of the conveyor belt, with respect to the direction of travel. If it is desired to rotate the boxes to the right when viewinq along the direction of travel of the conveyor belt, it is only necessary to swing pulley 20 back toward the source of boxes 51 while pulley 8 is positioned toward base stand 59. Then, the motor is merely reversed.

Sleeves 7 and 23 rotate with pullies 8 and 19, respectively, which is the same direction as endless belt 9. If a carton or flattened box was slightly out of position so that it contacts either sleeve 7 or 23, the rotation of the sleeves will assure the carton of being directed in the proper direction.

Optionally, stops 56 and 57 may be eliminated if the endless belt is properly positioned. However, it is preferred to employ stops 56 and 57 to rotate the endless belt at a speed slightly greater than that required to assure that each carton is firmly shoved against the stops in order to square up each and every carton for continuing movement down the conveyor belt. If the stops are not employed, and the boxes are rotating beyond 90°, then the belt is rotating too fast. Likewise, if the cartons are not quite rotating a full 90°, then the belt is rotating too slow.

The endless belt may be canted upwardly, if desired so that one pulley is higher than the other, as shown by line A—A in FIG. 7. This assures that each box or carton will adequately bear upon the endless belt so that it is rotated, rather than being influenced by the friction of surrounding cartons which may or may not be moving. Canting the endless belt may also be necessary when the flattened boxes or cartons are tightly packed and more vertically upstanding. This assures that the boxes will be rotated and won't trip over the endless belt, but will be rotated because the cant of the belt will assure adequate pressure is maintained against each carton.

The size and heaviness of each box are also factors which dictate the obtuse angle and degree of cant. Bigger, heavier boxes need more force to rotate them and hence, they must remain on the endless belt a bit longer, causing the obtuse angle to approach 90° rather than 180° and perhaps require more cant to assure adequate contacting force. Of course, the opposite is true for smaller lighter packages.

Once the boxes have been turned 90°, the conveyor belt should fully contact the boxes causing them to once again proceed in the original direction of travel. In this manner boxes can be packaged in any manner desired by manufacturer or end user.

What is claimed is:

1. A method of rotating the paper of a stream of moving overlapping stacked paper from one position to another on a conveyor belt comprising:
   positioning a rotator having a continuous article contacting surface substantially over said conveyor belt at an obtuse angle with respect to the direction of travel of said conveyor belt;
   driving said conveyor belt and said rotator;
   initially placing a portion of said stream of overlapping stacked paper on top of said continuous, article contacting surface; and
   advancing said stream of overlapping stacked paper on said conveyor belt so that the paper of said stream is progressively rotated by said continuous, article contacting surface from its original position to a second rotated position which is out of contact with the rotator causing the paper to fall back onto the conveyor belt.

2. The method of claim 1, wherein said stream of overlapping stacked paper is rotated from one side of said conveyor belt to the other side thereby forming a rotated stream of overlapping stacked paper.

3. The method of claim 2, wherein said stream of overlapping stacked paper is linearally offset with respect to the direction of the conveyor belt to said rotated stream of overlapping stacked paper.

4. The method of claim 1, wherein said stream of overlapping stacked paper is rotated by said article contacting surface until it contacts one or more stops.

5. A device for rotating a stream of moving, overlapping stacked paper comprising:
   a moving conveyor belt for linearly moving said overlapped stacked paper, a rotator positioned substantially over said conveyor belt at an obtuse angle with respect to the direction of travel of said conveyor belt, said rotator contacting a portion of said stream of overlapping stacked paper by engaging the raised ends of the overlapped paper as it is advanced by said conveyor belt, said rotator having a continuous, article contacting surface onto which the stream of moving overlapping stacked paper is engaged, said rotator causing the paper of the stream to assume a second rotated position when said continuous article contacting surface is driven, at which point the paper is out of contact with said rotator and falls back onto said conveyor belt.

6. The apparatus of claim 5, wherein said rotator includes one or more stops positioned vertically above said conveyor belt.

7. The apparatus of claim 5, wherein said rotator includes a pair of spaced-apart pulleys around which said article contacting surface rotates.

8. The apparatus of claim 7, wherein one of said pulleys is driven while the other of said pulleys is freely rotating.

9. The apparatus of claim 8, wherein said driven pulley is driven by a shaft of a motor.

10. The apparatus of claim 9, wherein said motor and said pair of spaced-apart pulleys are rigidly fastened to a support plate.

* * * * *